US008979506B2

(12) United States Patent
Kabir et al.

(10) Patent No.: US 8,979,506 B2
(45) Date of Patent: Mar. 17, 2015

(54) REVERSE ROTATION PREVENTION DEVICE

(75) Inventors: Omar M. Kabir, Waller, TX (US); Edward S. Czechowski, Orchard Park, NY (US)

(73) Assignee: Ingersoll-Rand Company, Davidson, NC (US)

( * ) Notice: Subject to any disclaimer, the term of this patent is extended or adjusted under 35 U.S.C. 154(b) by 1187 days.

(21) Appl. No.: 11/333,570

(22) Filed: Jan. 17, 2006

(65) Prior Publication Data
US 2007/0166158 A1 Jul. 19, 2007

(51) Int. Cl.
| F04B 49/00 | (2006.01) |
| F04D 25/16 | (2006.01) |
| F04D 27/00 | (2006.01) |
| F16D 41/12 | (2006.01) |
| F16D 41/18 | (2006.01) |
| B60T 1/00 | (2006.01) |
| F16D 63/00 | (2006.01) |
| F16D 27/00 | (2006.01) |
| F16D 121/18 | (2012.01) |
| F16D 127/00 | (2012.01) |

(52) U.S. Cl.
CPC ............ *F04D 25/163* (2013.01); *F04D 27/008* (2013.01); *F16D 41/12* (2013.01); *F16D 41/18* (2013.01); *B60T 1/005* (2013.01); *F16D 63/006* (2013.01); *F16D 27/00* (2013.01); *F16D 2121/18* (2013.01); *F16D 2127/004* (2013.01)

USPC .......................................... 417/214; 188/82.7

(58) Field of Classification Search
USPC .................... 417/214; 415/118, 232; 188/82.7
See application file for complete search history.

(56) References Cited

U.S. PATENT DOCUMENTS

| 3,021,924 | A | * | 2/1962 | Patterson, III et al. ....... 188/82.7 |
| 3,097,724 | A | * | 7/1963 | Bryant, II et al. ............ 188/82.7 |
| 3,791,231 | A | * | 2/1974 | Geary .............................. 74/142 |
| 3,799,692 | A | * | 3/1974 | Shields .......................... 415/118 |
| 3,985,212 | A | * | 10/1976 | Gershnow et al. ........ 192/12 BA |
| 6,692,224 | B2 | * | 2/2004 | Miura et al. ..................... 415/66 |

FOREIGN PATENT DOCUMENTS

EP 0489530 A1 6/1992

* cited by examiner

*Primary Examiner* — Peter J Bertheaud
(74) *Attorney, Agent, or Firm* — Krieg DeVault LLP

(57) ABSTRACT

Apparatus and methods to prevent the rotation of a shaft in one direction using a device comprising a collar disposed around the shaft, a locking arm with an unlocked position and a locked position, and an actuator capable of moving the locking-arm between the unlocked and locked position. When the locking arm is in the unlocked position, the collar and shaft are allowed to rotate in a first direction. However, when the locking arm is in the locked position, the collar and shaft are prevented from rotating in a second direction. This device can also be used to prevent the reverse rotation of a rotating compressor.

28 Claims, 7 Drawing Sheets

REVERSE ROTATION PREVENTION DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to rotating compression equipment. More particularly, the present invention relates to devices to prevent the reverse rotation of compression equipment. Still more particularly, the present invention relates to devices to prevent reverse rotation by directly engaging the driveshaft of a centrifugal compressor.

In general, rotating compression equipment, such as compressors and pumps, is used to increase the pressure of a fluid in order to move fluid from one point to another or to provide a supply of pressurized fluid. The compression equipment creates a suction effect at its inlet that draws in fluid so that work can be performed on the fluid. Once pressurized, fluid can be discharged to other equipment, compressed further, used immediately, or stored in an accumulator for later use. Rotating compression equipment generally utilizes a rotating element, usually comprising a shaft and impellor or rotor, as a means to compress a fluid. Rotating pumps include centrifugal or radial flow pumps, axial flow or propeller pumps, etc. Rotating compressors include centrifugal compressors, axial or in-line compressors, scroll compressors, etc.

Reverse rotation in rotating compression equipment can occur when the rotating equipment is shut down, intentionally or unintentionally, such as when there is a power interruption. When power is no longer provided to rotate the driveshaft, the rotating components of the compression equipment are free to move in response to pressure differentials existing between the inlet and outlet. There is a tendency for the compressed fluid stored in the accumulator and compressed fluid in the compressor outlet to backflow. If unimpeded, the backflow of the compressed fluid will exert a force on the impellor(s), which may result in reverse rotation of the rotating components. Although reverse rotation is commonly caused by the backflow of compressed fluid, in certain equipment that is driven by an electric motor, reverse rotation can also be caused by unintentionally connecting the electric motor leads backwards.

Although the reverse rotation may be of short and transient duration, there are numerous negative consequences of reverse rotation. Reverse rotation may result in objectionable noise and vibration. Further, lubrication systems may not be designed to operate under reverse rotation conditions, or may operate poorly under reverse rotation conditions. Failure of the lubrication system may result in unnecessary wear and physical damage to various parts. Still further, drive mechanisms, such as bearings, gears, and pinions, may not be designed to operate under reverse rotation conditions, or may operate poorly under reverse rotation conditions. Such bearings, gears, and pinions may also suffer unnecessary wear and physical damage under reverse rotation conditions. Still further, in the case where reverse rotation is taking place and the equipment suddenly regains power, the abrupt application of torque to the drive shaft opposite the direction of reverse rotation may result in extremely high stresses in the drive mechanisms (e.g., driveshaft, gears, pinions, etc.). These stresses may be significantly larger than stresses under normal operating conditions and may actually result in the physical breaking of certain components.

Damage to the certain components by unnecessary wear, physical breakage, or other negative consequences of reverse rotation may necessitate a complete shutdown and repair of the compression equipment. The downtime required to repair damages cause by reverse rotation may be very lengthy and costly.

Thus, there remains a need to develop methods and apparatus for more reliable means to prevent reverse rotation of a compressor, which overcome some of the foregoing difficulties while providing more advantageous overall results.

SUMMARY OF THE PREFERRED EMBODIMENTS

These and other needs in the art are addressed by apparatus and methods to prevent the rotation of a shaft in one direction that comprises a collar disposed around the shaft, a locking arm with an unlocked position and a locked position, and an actuator operable to move the locking-arm between the unlocked and locked position. When the locking arm is in the unlocked position, the collar and shaft are allowed to rotate in a first direction. However, when the locking arm is in the locked position, the collar and shaft are prevented from rotating in a second direction.

Embodiments may also comprise apparatus and methods to prevent the reverse rotation of a compressor that comprises a driveshaft, a power supply coupled to one end of the driveshaft operable to rotate the driveshaft in a first direction, a collar disposed around the driveshaft, and a locking-arm with an unlocked position and a locked position. When the locking-arm is in the unlocked position, the collar and the driveshaft are allowed to rotate in the first direction. However, when the locking-arm is in the locked position, the driveshaft is prevented from rotating in a second direction.

Thus, embodiments of the present invention comprise a combination of features and advantages that overcome various problems of prior devices. The various characteristics described above, as well as other features, will be readily apparent to those skilled in the art upon reading the following detailed description of the preferred embodiments of the invention, and by referring to the accompanying drawings. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
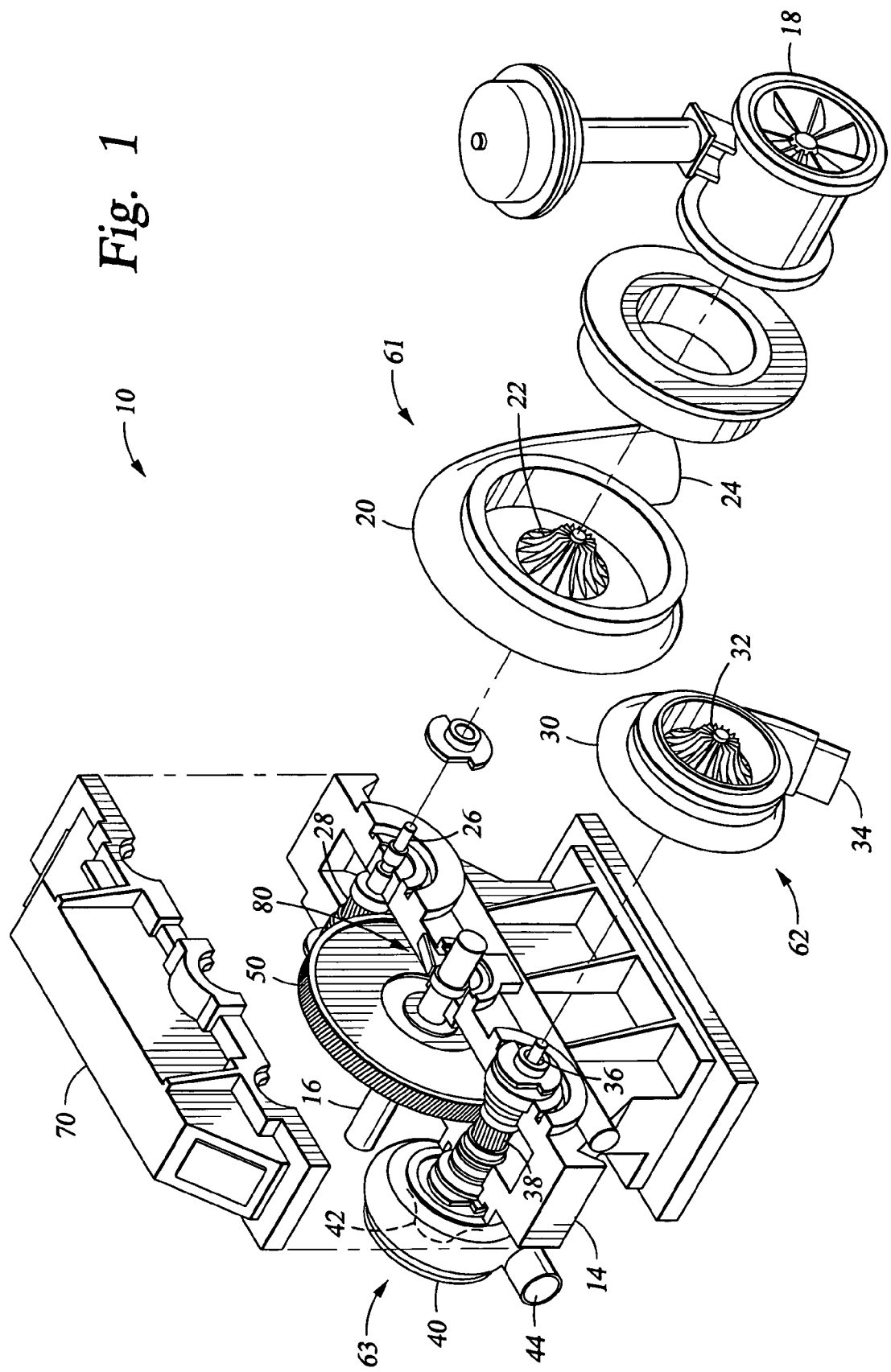
FIG. 1 is a partially exploded view of a three-stage centrifugal compressor including a reverse rotation prevention device.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. Also, when a compressor is referred to as "operating normally," this refers to the compressor that is properly powered, compressing fluid and not in reverse rotation. Further, when a shaft is referred to as rotating in the "forward direction," or in "forward rotation," this refers to a shaft that is rotating in the desired direction and not in reverse rotation.

Also, the term "shaft" is intended to mean any elongated body that can be rotated about its longitudinal axis, including without limitation driveshafts, compressor shafts, etc. In addition, in the discussion and claims that follow, it may be sometimes stated that certain components or elements are in fluid communication. By this it is meant that the components are constructed and interrelated such that a fluid could be communicated between them, as via a passageway, tube, or conduit.

Figure 2:
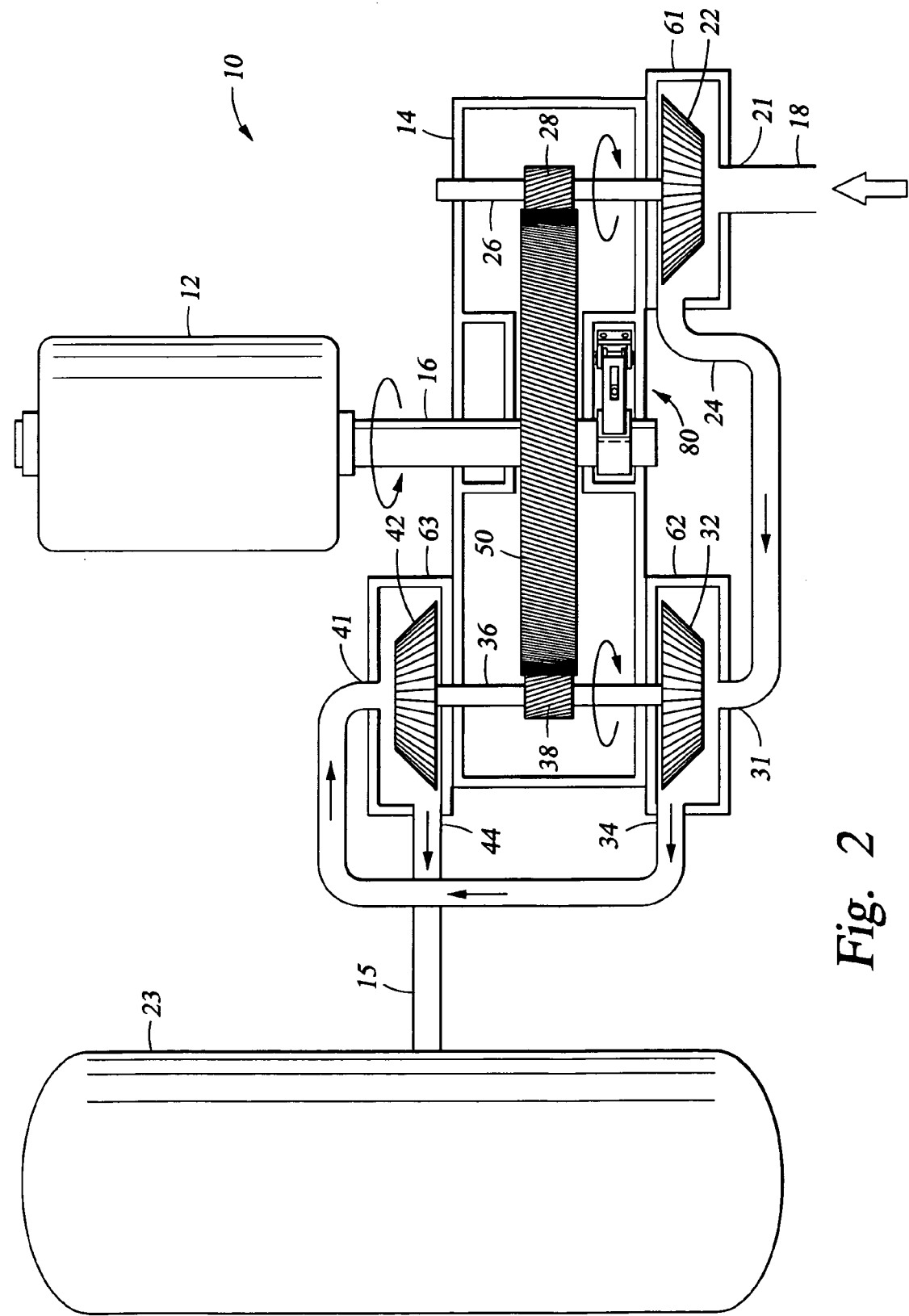
FIG. 2 is a schematic top view of a three-stage centrifugal compressor including a reverse rotation prevention device.

Referring now to FIGS. 1 and 2, compressor 10 comprises driveshaft 16, reverse rotation prevention device 80, bull-gear 50, power supply 12, frame 14, and three compression stages (first-stage compressor 61, second-stage compressor 62, and third-stage compressor 63). First-stage compressor 61 comprises first-stage housing 20, first-stage impellor 22, and first-stage outlet 24. Second-stage compressor 62 comprises second-stage housing 30, second-stage impellor 32, and second-stage outlet 34. Third-stage compressor 63 comprises third-stage housing 40, third-stage impellor 42, and third-stage outlet 44. First-stage impellor 22 is coupled to first-stage shaft 26 such that first-stage impellor 22 is rotationally fixed relative to first-stage shaft 26. Similarly, second-stage impellor 32 and third-stage impellor 42 are rotationally fixed relative to second-stage shaft 36.

Power supply 12 is coupled to one end of driveshaft 16 and provides the torque to rotate driveshaft 16 and hence, run compressor 10. Examples of power supplies that may be used to drive a compressor include without limitation internal combustion engines, electric motors, turbines, etc. Bull-gear 50 is rotationally fixed relative to driveshaft 16. Bull-gear 50 is coupled to first-stage shaft 26 and second-stage shaft 36 via first-stage pinion 28 and second-stage pinion 38, respectively. As driveshaft 16 rotates, bull-gear 50 rotates, thereby resulting in the rotation of first-stage impellor 22, second-stage impellor 32, and third-stage impellor 42. Bearings (not shown) between frame 14 and each rotating shaft (i.e., driveshaft 16, first-stage shaft 26 and second-stage shaft 36) provide support and lubrication during the rotation of each shaft.

When compressor 10 is operating normally (i.e., not in reverse rotation), fluid enters compressor 10 at compressor inlet 18. Fluid passes through first-stage inlet 21 into first-stage compressor 61. The fluid is compressed by first-stage compressor 61 and is discharged at first-stage outlet 24. The compressed fluid from first-stage outlet 24 enters second-stage compressor 62 at second-stage inlet 38. Second-stage compressor 62 further compresses the fluid and discharges the compressed fluid at second-stage outlet 34. The compressed fluid from second-stage outlet 34 enters third-stage compressor 63 at third-stage inlet 48. Third-stage compressor 63 further compresses the fluid and discharges the compressed fluid at third-stage outlet 44. At each successive stage, the fluid is further compressed. Finally, compressed fluid is discharged from compressor 10 at third-stage outlet 44.

The compressed fluid discharged from third-stage outlet 44 travels through discharge conduit 15 to accumulator 23. The compressed fluid may be stored in accumulator 23 until such time as compressed fluid is needed. In other embodiments, the accumulator may be a storage vessel, or process plant or some length of piping which has the ability to accumulate compressed fluid discharged from a compressor.

Figure 3:
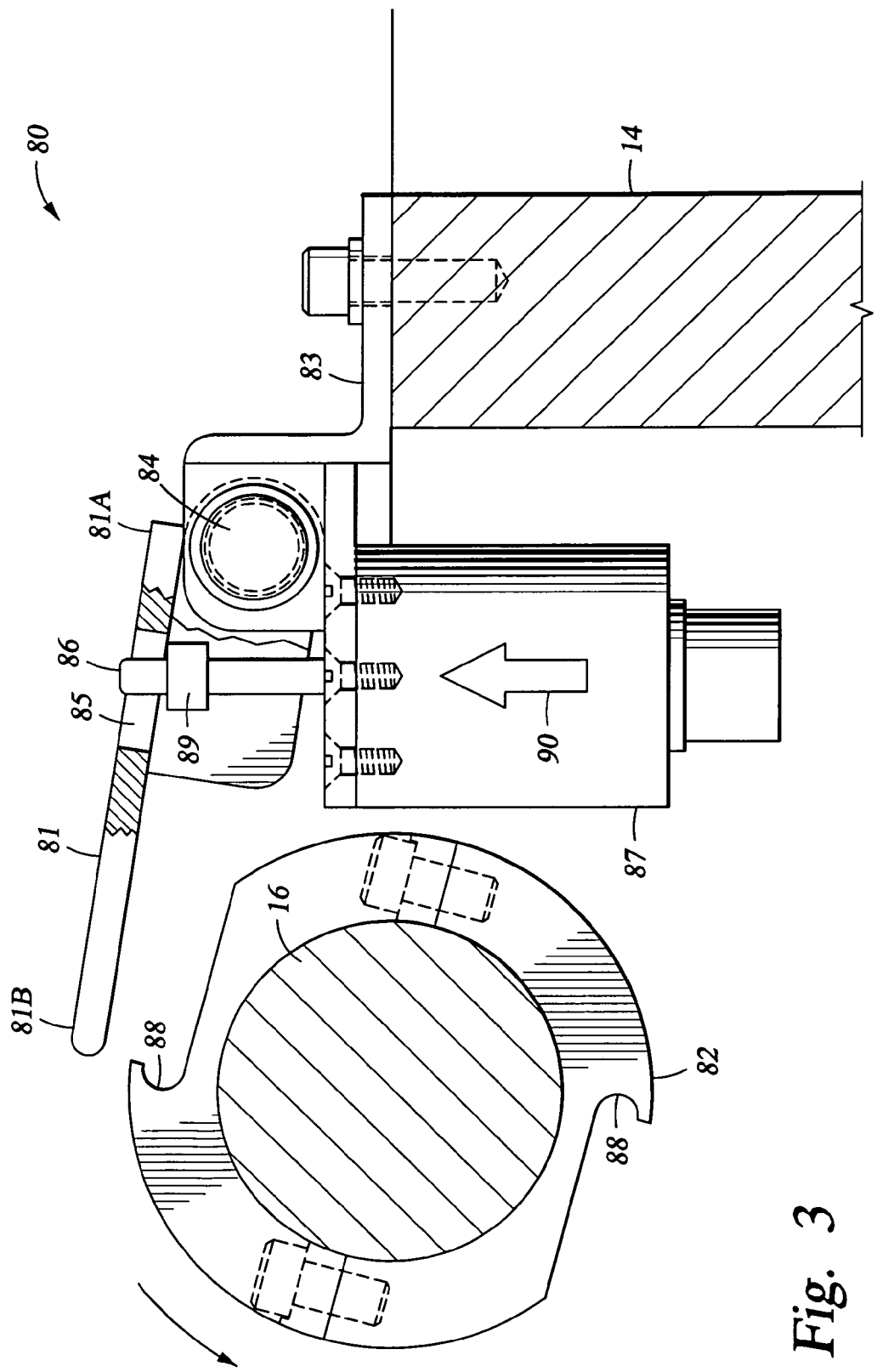
FIG. 3 is an end view of one embodiment of a reverse rotation prevention device in the unlocked position.

Referring to FIGS. 2 and 3, reverse rotation prevention device 80 is shown attached to frame 14 of compressor 10. Reverse rotation prevention device 80 comprises locking-arm 81, collar 82, hinge 84, and actuator 87. Locking-arm 81, actuator 87, and hinge 84 are shown mounted to frame 14 by bracket 83. Locking-arm 81 has a free-end 81B and a hinged-end 81A. Hinged-end 81A is attached to hinge 84, allowing locking-arm 81 to pivot about hinge 84 in response to actuator 87.

Collar 82 is rotationally fixed relative to driveshaft 16. Two cutouts 88 are provided on collar 82. In other embodiments, collar 82 may include only one cutout or more than one cutout. Further, the cutouts may be spaced uniformly or non-uniformly about the outside of collar 82.

In FIG. 3, locking-arm 81 is shown in the unlocked position. During normal operation of compressor 10 (i.e., not in reverse rotation), locking-arm 81 is maintained in the unlocked position by actuator 87. Actuator 87 provides a force 90 to linearly extend pin 86. Force 90 is transferred to locking-arm 81 by ring 89 of pin 86. Actuator 87 may be electrically coupled to power supply 12 such that actuator 87 has power to generate force 90, thereby maintaining locking-arm 81 in the unlocked position, as long as power supply 12 is running. In select embodiments, a sensor and/or other control means may be provided to control the operation of actuator 87 such that actuator 87 maintains locking-arm 81 in the unlocked position, as long as power supply 12 provides torque to rotate driveshaft 16.

As ring 89 translates upward force 90 to locking-arm 81, locking-arm 81 pivots about hinge 84 thereby causing free-end 81B to rotate away from collar 82. A slot 85 is provided in locking-arm 81 which allows locking-arm 81 to pivot about hinge 84 relative to pin 86 as pin 86 extends linearly from actuator 87.

While in the unlocked position, driveshaft 16 and collar 82 are free to rotate about the longitudinal axis of driveshaft 16. Further, when locking-arm 81 is in the unlocked position, locking-arm 81 does not contact collar 82.

Referring again to FIGS. 1 and 2, reverse rotation may occur when power supply 12 is shut down, intentionally or unintentionally. If power supply 12 is shut down, pressure differentials across compressor 10 will attempt to equalize. Compressed fluid at high pressure in accumulator 23 will attempt to backflow through compressor 10 to inlet 18. This backflow will exert a force on the compressor impellor(s), thereby generating a torque on bull-gear 50 and driveshaft 16, resulting in reverse rotation. Reverse rotation prevention device 80 serves to prevent the reverse rotation of driveshaft 16, and hence prevent the reverse rotation of compressor 10.

Figure 4:
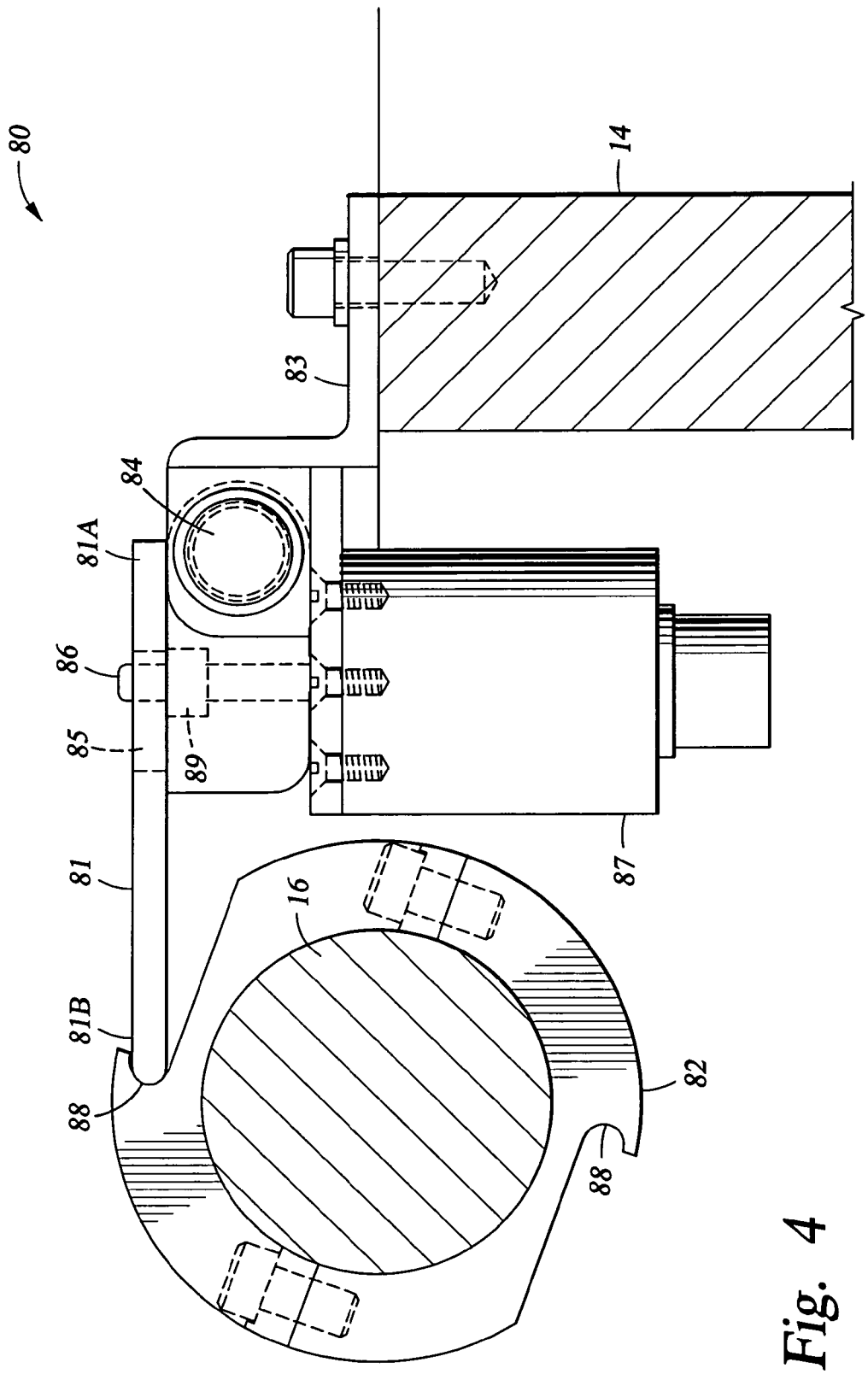
FIG. 4 is an end view of the reverse rotation prevention device of FIG. 3 shown in the locked position.

Referring to FIG. 4, locking-arm 81 is shown in the locked position. When locking-arm 81 is in the locked position, free-end 81B positively engages cutout 88. Engagement of free-end 81A and cutout 88 prevents the reverse rotation of collar 82, thereby preventing reverse rotation of driveshaft 16.

As previously discussed, actuator 87 maintains locking-arm 81 in the unlocked position as long as power supply 12 provides torque to rotate driveshaft 16 in the forward direction. For example, actuator 87 may be electrically coupled or electrically interlocked to power supply 12 such that actuator 87 has power as long as power supply 12 has power. However, the instant the power supply is shut-down, force 90 provided by actuator 87 ceases. For example, power to actuator 87 may be simultaneously shut-down whenever power supply 12 is shut down.

Once force 90 acting on pin 86 ceases, pin 86 moves linearly downward in response to gravity or a biasing means (not shown) that tends to retract pin 86 linearly into actuator 87. In another embodiment, a fail safe spring is provided to retract pin 86 linearly into actuator 87 when force 90 ceases. Further, once force 90 ceases, pin 86 and ring 89 no longer maintain locking-arm 81 in the unlocked position. Hence, free-end 81B pivots downward and contacts collar 82. Once free-end 81B is in contact with collar 82, if driveshaft 16 begins to rotate in reverse, locking-arm 81 will positively engage cutout 88 thereby preventing the reverse rotation of driveshaft 16. By this means, when power supply 12 is shut-down, reverse rotation prevention device 80 assumes a fail-safe position preventing the reverse rotation of driveshaft 16 and compressor 10.

Figure 5A:
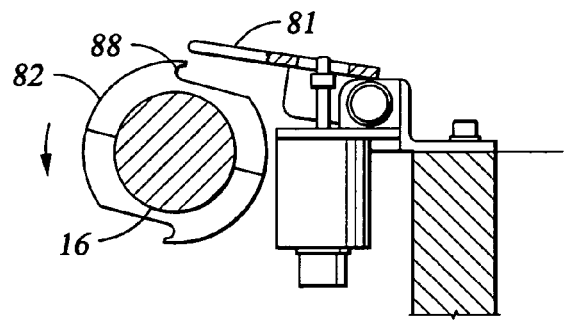
FIGS. 5a to 5e are selected end views of the reverse rotation prevention device of FIGS. 3 and 4 preventing reverse rotation.
Figure 5B:
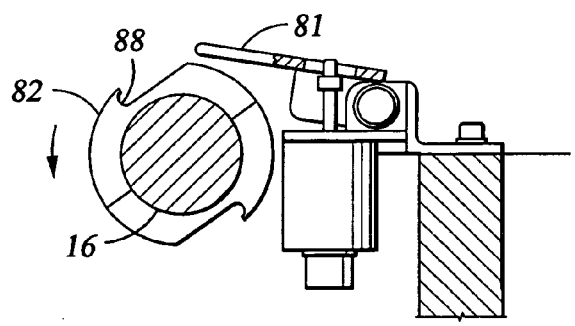
Figure 5C:
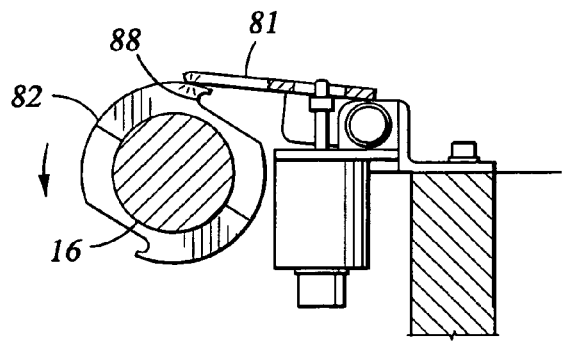
Figure 5D:
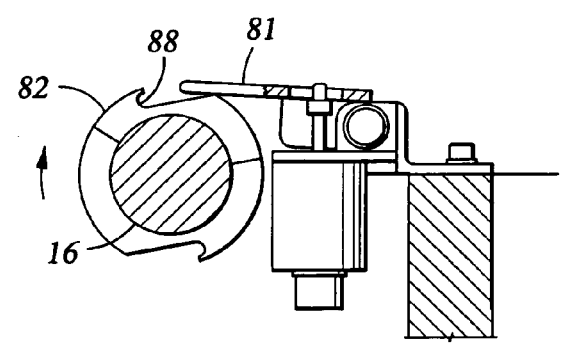
Figure 5E:
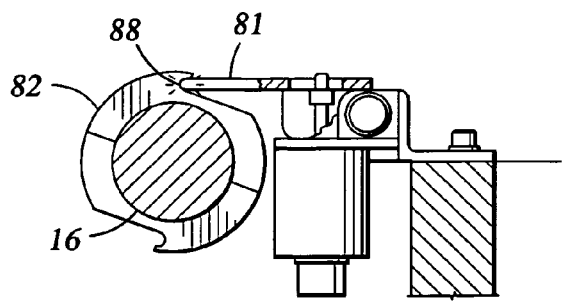

Referring to FIGS. 5a to 5e, reverse rotation prevention device 80 is shown in five sequential positions. FIG. 5a shows locking-arm 81 in the unlocked position while power supply 12 provides torque to rotate driveshaft 16 in the forward direction. FIG. 5b again shows locking-arm 81 in the unlocked position as power supply 12 continues to provide torque to rotate driveshaft 16 in the forward direction. In FIG. 5c, power supply 12 has shut down and no longer provides the torque to rotate driveshaft 16 in the forward direction. Driveshaft 16 and collar 82 continue their forward rotation, but the rotational velocity of driveshaft 16 and collar 82 declines due to the effects of friction and pressure equalization across compressor 10. Once power supply 12 is shut down, locking-arm 81 comes into contact with collar 82 since actuator 87 no longer provides force 90 to maintain locking-arm 81 in the unlocked position. The rotational velocity of driveshaft 16 declines until a zero forward rotational velocity is achieved. FIG. 5d shows locking-arm 81 remaining in contact with collar 82 just as driveshaft 16 and collar 82 beginning to rotate in reverse. Finally, in FIG. 5e, the reverse rotation of driveshaft 16 is physically stopped once cutout 88 positively engages locking-arm 81.

In the embodiments shown in FIGS. 3-5, locking-arm 81 does not contact collar 82 as long as a power supply provides torque to rotate driveshaft 16 in the forward direction. For example, power to actuator 87 may be simultaneously shut-down whenever power supply 12 is shut down. However, if for some reason actuator 87 fails while power supply 12 continues to provide torque to rotate driveshaft 16 in the forward direction, and locking-arm 81 comes into contact with collar 82, locking-arm 81 will not positively engage cutout 88 and thus will not prevent the continued rotation of driveshaft 16 in the forward direction. Thus, one skilled in the art will appreciate that regardless of whether actuator 87 fails or not, reverse rotation prevention device 80 will permit the forward rotation of driveshaft 16 and prevent the reverse rotation of driveshaft 16. In other embodiments, locking-arm 81 of reverse rotation prevention device 80 may contact collar 82 while a power supply is providing torque to rotate driveshaft 16 in the forward direction.

Thus, reverse rotation prevention device 80 is provided adjacent driveshaft 16 to prevent the reverse rotation of driveshaft 16 and compressor 10 when power supply 12 is shut down, intentionally or unintentionally. Further, by preventing reverse rotation of compressor 10 before it begins, reverse rotation prevention device 80 also serves to eliminate the scenario where the compressor is operating in the reverse rotation and suddenly regains power.

In certain embodiments, reverse rotation prevention device 80 may be positioned adjacent to a compressor shaft other than driveshaft 16 (e.g., first-stage shaft 26, second-stage shaft 36, etc.) to prevent the reverse rotation of the compressor. Further, reverse rotation prevention device 80 may be located at different locations along the length of such compressor shaft. Still further, more than one reverse rotation prevention device 80 may be provided, on a single compressor shaft or on different compressor shafts, to prevent the reverse rotation of the compressor.

Although compressor 10 in FIGS. 1 and 2 is shown as a three-stage centrifugal compressor, embodiments of the present invention may be used to prevent the reverse rotation of any rotating compressor (e.g., centrifugal compressors, axial compressors, scroll compressors, in-line compressors, etc.), any rotating pump, or any rotating shaft.

Figure 6:
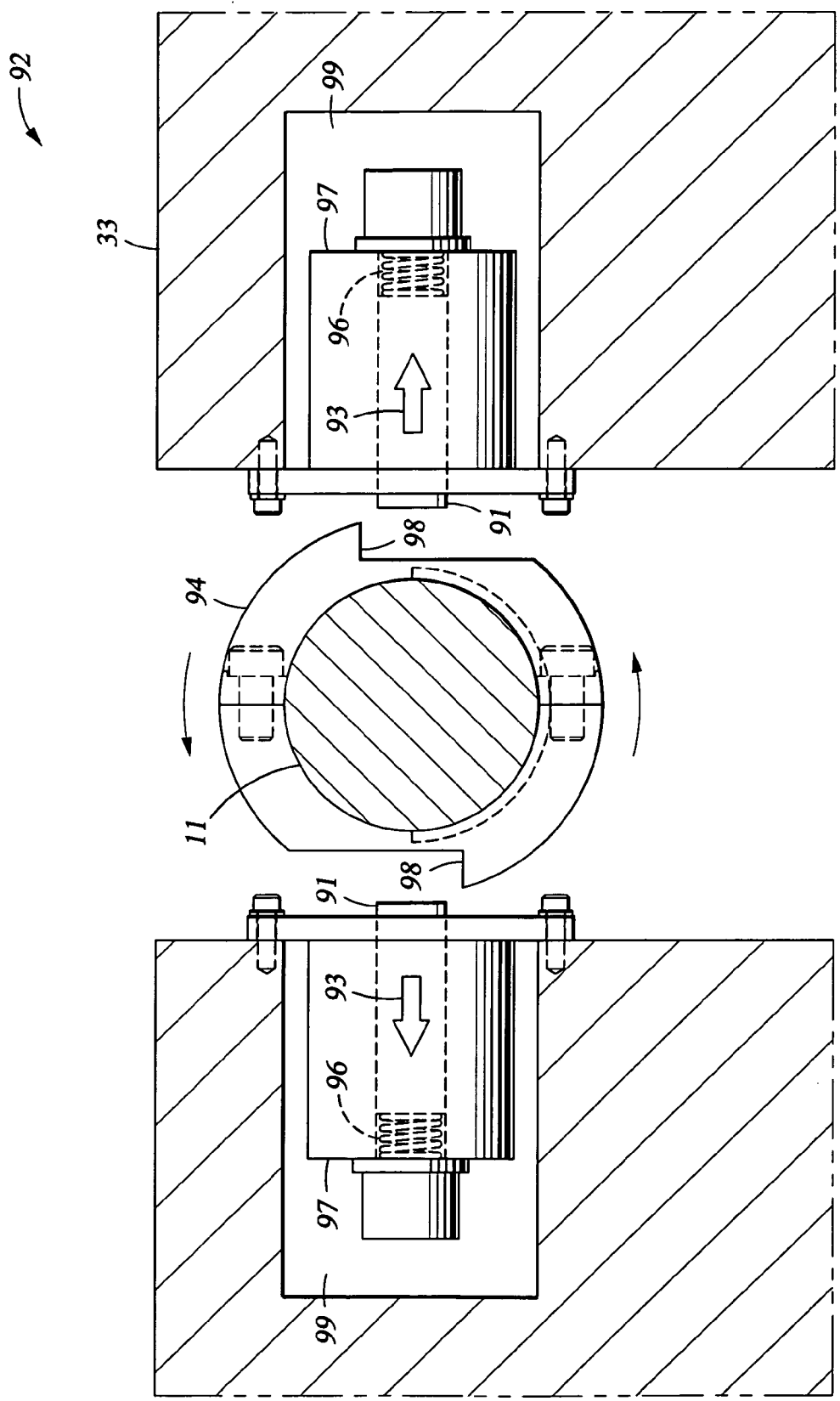
FIG. 6 is an end view of one embodiment of a reverse rotation prevention device.
Figure 7:
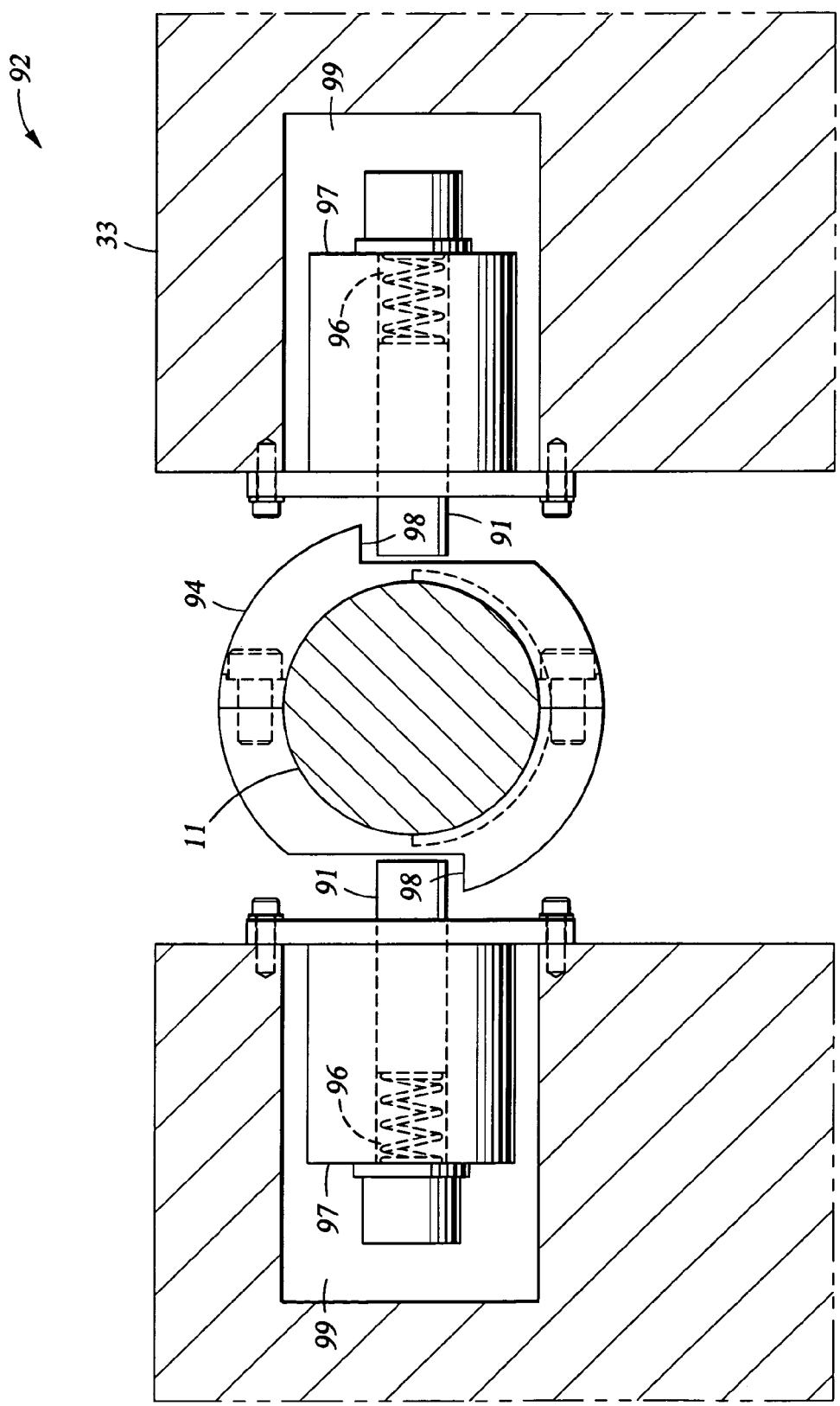
FIG. 7 is an end view of the reverse rotation prevention device of FIG. 6 shown in the locked position.

Referring to FIGS. 6 and 7, an alternative embodiment of the present invention is shown. Reverse rotation prevention device 92 comprises locking-arm 91, collar 94, and actuator 97. Locking-arm 91 is disposed within actuator 97 and may extend linearly from actuator 97. Recess 99 is provided within support 33 to house actuator 97. Support 33 may be part of a compressor frame or any suitable structure capable of supporting reverse rotation device 92 adjacent a rotating shaft.

Collar 94 is disposed around shaft 11 and is rotationally fixed relative to shaft 11. Shaft 11 may be a compressor driveshaft or any other rotating shaft in which it is desirable to prevent rotation in one direction. Two cutouts 98 are provided on collar 94. In other embodiments, collar 94 may include only one cutout or more than one cutout. Further, the cutouts may be spaced uniformly or non-uniformly about the outside of collar 94.

In FIG. 6, locking-arm 91 is shown in the unlocked position. When locking-arm 91 is in the unlocked position, shaft 11 and collar 94 are free to rotate about the longitudinal axis of shaft 11. Further, when locking-arm 91 is in the unlocked position, locking-arm 91 is disposed within actuator 97 far enough such that locking-arm 91 does not positively engage cutout 98 of collar 94.

Reverse rotation prevention device 90 is maintained in the unlocked position by actuator 97. Biasing-device 96 is provided within actuator 97. Biasing-device 96 provides a force that attempts to linearly extend locking-arm 91 from actuator 97. As shown in FIGS. 6 and 7, biasing-device 96 is a spring, however, in other embodiments, the biasing device may be a permanent magnet, electromagnet, or other device capable of generating a force. When powered, actuator 97 provides a force 93 to locking-arm 91 that overcomes the force generated by biasing device 96, thereby preventing locking-arm 91 from extending from actuator 97 far enough to contact collar 94. In certain embodiments, actuator 97 may be electrically coupled or electrically interlocked to the power supply that rotates shaft 11 such that actuator 97 has power to exert force 93 as long as the power supply is running. In other embodiments, a sensor or other control means may be provided to control the operation of actuator 97 such that actuator 97 exerts force 93, thereby maintaining locking-arm 91 in the unlocked position, as long as a power supply is providing torque to rotate shaft 11.

In FIG. 7, locking-arm 91 is shown in the locked position. When locking-arm 91 is in the locked position, locking-arm 91 positively engages cutout 98 of collar 94, thereby preventing the reverse rotation of shaft 11.

Force 93 shown in FIG. 6 is provided by actuator 97 as long as a power supply (not shown) provides torque to rotate shaft 11 in the forward direction. However, when torque is no longer applied to rotate shaft 11 in the forward direction (e.g., the power supply is shut down), force 93 ceases. For example, the actuator 97 may be electrically coupled to the power supply that provides the torque to rotate shaft 11 such that actuator 97 is shut down when the power supply is shut down. In certain embodiments, a sensor and/or other control means may be provided to control the operation of actuator 97 such that actuator 97 maintains locking-arm 91 in the unlocked position, as long as a power supply provides torque to rotate shaft 11.

Once force 93 acting on locking-arm 91 ceases, locking-arm 91 extends from actuator 97 until it contacts collar 94 in response to biasing device 96. Near the point where shaft 11 achieves a zero rotational velocity, locking-arm 91 will extend far enough to fully engage cutout 98 of collar 94, thereby preventing possible reverse rotation. By this means, when the power supply providing torque to rotate shaft 11 in the forward direction is shut-down, reverse rotation prevention device 92 assumes a fail-safe position preventing reverse rotation of shaft 11.

Two actuators, each operable to extend a locking-arm, are shown in FIGS. 6 and 7. In other embodiments, a single actuator or more than two actuators may be used to prevent the reverse rotation of a shaft or compressor.

In the embodiments shown in FIGS. 3-7, collar 82 and collar 94 are each composed of two parts that are bolted together around driveshaft 16 and shaft 11 respectively. Frictional forces acting at the interface between the collar and shaft prevent the collar from moving linearly or rotationally relative to the shaft. In other embodiments, the collar may be coupled to shaft by other means, including without limitation press fitting, welding, etc. Further, the collar may be coupled to shaft by the mechanical interaction of a key on the inside surface of the collar that mates with a corresponding cutout on the outside of the shaft or vice versa. Still further, the collar and shaft may be machined or cast as a single piece.

The actuator used to maintain the reverse rotation prevention device in the unlocked position may be any device capable of generating a force including without limitation an electromagnetic solenoid, a hydraulic actuator, an electric motor, etc. Further, the actuator may be mounted in any suitable manner as long as the actuator can provide the force necessary to maintain the reverse rotation prevention device in the unlocked position, while allowing the device to assume the locked position when the torque provided to rotate the shaft is interrupted.

The components of the reverse rotation prevention device may be made of any suitable material including without limitation metals (e.g., iron, aluminum, titanium, etc.), metal alloys (e.g., steel, inconel, etc.), non-metals (e.g., plastic, wood, etc.), composites (e.g., carbon fiber, etc.), etc. Further, if corrosion is a concern, the components of the reverse rotation prevention device may be made of any suitable corrosive resistant material and/or coated with a suitable corrosive protective layer.

In the manner described, the present invention has the advantage of directly and physically preventing the rotation of a shaft in the reverse direction. More particularly, in the manner described, the present invention has the advantage of directly and physically preventing the reverse rotation of a compressor. By directly preventing the reverse rotation of a compressor, the present invention eliminates the need for specialized two-way bearings designed for forward and reverse rotation, specialized two-way gears and pinions designed for forward and reverse rotation, and specialized lubrication systems designed to provide adequate lubrication in forward and reverse rotation. Further, by directly preventing reverse rotation, the present invention provides protection against physical breakage of various compressor parts. In particular, the present invention will prevent the over-torquing of a compressor driveshaft, which may result in physical breakage of the driveshaft, in the case when the compressor is rotating in reverse and suddenly the compressor power supply is turned back on and applies a torque to the compressor shaft in a direction opposite to the reverse rotation. Still further, another advantage of the present invention is its ability to assume a fail-safe, locked position when a compressor is shut down.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the reverse rotation prevention device retains the advantages discussed herein. Accordingly, the scope of protection is not limited to the embodiments described herein, but is only limited by the claims that follow, the scope of which shall include all equivalents of the subject matter of the claims.

What is claimed is:

1. A device to prevent a shaft powered to rotate in a first direction from rotating only in a second direction comprising:
    a collar disposed around the shaft, wherein said collar is rotationally fixed relative to the shaft, the collar comprising a cutout;
    a locking-arm with an unlocked position allowing said collar and the shaft to rotate in a first direction and a locked position;
    a self-operable actuator to automatically move said locking-arm between both the locked position and the unlocked position, said actuator designed to move said locking-arm into the locked position upon the shaft not being powered to rotate; and
    wherein the shaft is prevented from rotation only in the second direction with the locking-arm in the locked position and positively engaging the cutout.

2. The device of claim 1, wherein said locking-arm does not contact said collar when said locking-arm is in the unlocked position.

3. The device of claim 1, wherein said locking-arm has a free-end and a hinged-end.

4. The device of claim 3, further comprising a hinge attached to said hinged-end of said locking-arm, wherein said locking-arm can pivot about said hinged-end.

5. The device of claim 4, wherein said locking-arm pivots about said hinge when said actuator moves said locking-arm between the locked position and the unlocked position.

6. The device of claim 5, wherein said free-end positively engages said cutout.

7. The device of claim 1, wherein said locking-arm is at least partially disposed within said actuator and wherein said locking-arm extends linearly from said actuator when said locking-arm is in the locked position.

8. The device of claim 1, further comprising a power supply coupled to the shaft, wherein said power supply provides torque to rotate the shaft only in said first direction.

9. The device of claim 8, wherein said actuator maintains said locking-arm in the unlocked position as long as said power supply provides torque to rotate the shaft in said first direction.

10. The device of claim 8, wherein said actuator moves said locking-arm from the unlocked position to the locked position when said power supply does not provide torque to rotate the shaft in said first direction.

11. The device of claim 8, further comprising a compressor bull-gear attached to the shaft, wherein said bull-gear is rotationally fixed relative to the shaft.

12. The device of claim 11, further comprising an impellor coupled to said compressor bull-gear, wherein said impellor rotates when said compressor bull-gear rotates.

13. The device of claim 1, wherein said actuator can automatically move said locking-arm from said locked position to said unlocked position using electrical power.

14. The device of claim 1, wherein said actuator can automatically move said locking-arm from said locked position to said unlocked position using hydraulic power.

15. A device to only prevent the reverse rotation of a rotating compressor comprising:
    a driveshaft rotatable in a forward direction and a reverse direction;
    a power supply coupled to one end of said driveshaft, wherein said power supply is operable to rotate said driveshaft only in the forward direction;
    a collar disposed around said driveshaft, wherein said collar is rotationally fixed relative to said driveshaft, said collar comprising a cutout;
    a locking-arm with an unlocked position allowing said collar and said driveshaft to rotate in said first direction and a locked position; and
    a self-operable actuator to automatically move said locking-arm between both said locked position and said unlocked position, said actuator designed to move said locking-arm into the locked position upon the power supply not rotating the driveshaft in the forward direction; and
    wherein the driveshaft is prevented from rotation only in the second direction with the locking-arm in the locked position and positively engaging the cutout.

16. The device of claim 15, wherein said locking-arm does not contact said collar when said locking-arm is in said unlocked position.

17. The device of claim 15, wherein said locking-arm has a free-end and a hinged-end and further comprising a hinge attached to said hinged-end of said locking-arm, wherein said locking-arm can pivot about said hinged-end.

18. The device of claim 17, wherein said locking-arm pivots about said hinge when said actuator moves said locking-arm between said locked position and said unlocked position.

19. The device of claim 18, wherein said free-end positively engages said at least one cutout when said locking-arm is in said locked position.

20. The device of claim 15, wherein said locking-arm is disposed within said actuator and wherein said locking-arm extends linearly from said actuator when said locking-arm is in said locked position.

21. The device of claim 15, wherein said actuator maintains said locking-arm in said unlocked position as long as said power supply rotates said driveshaft in said first direction.

22. The device of claim 15, wherein said actuator moves said locking-arm from the unlocked position to the locked position when said power supply does not rotate said driveshaft in said first direction.

23. The device of claim 15, wherein said actuator can automatically move said locking-arm from said locked position to said unlocked position using electrical power.

24. The device of claim 15, wherein said actuator can automatically move said locking-arm from said locked position to said unlocked position using hydraulic power.

25. A compressor comprising:
    a driveshaft;
    a compressor bull-gear attached to said driveshaft, wherein said bull-gear is rotationally fixed relative to said driveshaft;
    a power supply coupled to one end of said driveshaft, wherein said power supply provides torque to rotate said driveshaft in a first direction; and
    means to prevent the rotation of said driveshaft in a second direction by automatically actively positively engaging said driveshaft in a locked position when said power supply does not provide torque to rotate said driveshaft and automatically actively disengaging said driveshaft in an unlocked position as long as said power supply provides torque to rotate the shaft.

26. The compressor of claim 25 further comprising an impellor coupled to said compressor bull-gear, wherein said impellor rotates when said compressor bull-gear rotates.

27. The compressor of claim 25, wherein the means automatically actively disengages said driveshaft in said unlocked position using electrical power.

28. The compressor of claim 25, wherein the means automatically actively disengages said driveshaft in said unlocked position using hydraulic power.

* * * * *